United States Patent
Huebner

(10) Patent No.: US 7,930,116 B2
(45) Date of Patent: Apr. 19, 2011

(54) PROCEDURE FOR DIAGNOSING A METERING VALVE OF AN EXHAUST GAS TREATMENT DEVICE AND DEVICE FOR IMPLEMENTING THE PROCEDURE

(75) Inventor: Peter Huebner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/332,968

(22) Filed: Dec. 11, 2008

(65) Prior Publication Data

US 2009/0192732 A1 Jul. 30, 2009

(30) Foreign Application Priority Data

Jan. 24, 2008 (DE) .................. 10 2008 005 989

(51) Int. Cl.
*G01L 7/00* (2006.01)
*G06F 1/38* (2006.01)

(52) U.S. Cl. ............... 702/50; 60/286; 702/47

(58) Field of Classification Search ........... 702/45, 702/47, 51, 100, 138, 183, 185; 73/114.39, 73/114.74, 114.76; 60/277, 286
See application file for complete search history.

(56) References Cited

U.S. PATENT DOCUMENTS 7,665,295 B2 * 2/2010 Pfaeffle et al. ............... 60/286
2003/0033799 A1 * 2/2003 Scheying ..................... 60/286
2008/0264041 A1 * 10/2008 Gerlach ....................... 60/286

FOREIGN PATENT DOCUMENTS

| DE | 101 39 142 | 2/2003 |
|---|---|---|
| DE | 10 2004 022 115 | 11/2005 |
| DE | 10 2004 043 366 | 3/2006 |
| DE | 10 2004 044 506 | 3/2006 |
| DE | 10 2005 001 119 | 7/2006 |

* cited by examiner

*Primary Examiner* — John H Le
(74) *Attorney, Agent, or Firm* — Merchant & Gould P.C.

(57) ABSTRACT

Suggested are a procedure for diagnosing a metering valve (14) of an exhaust gas treatment device (22), which doses a reagent (16) into the exhaust gas area (11) of a combustion process, whereby the reagent (16) is brought to a metering pressure ($p\_Ds$) by a pump (17) and which is dosed by the metering valve (14), at which the diagnosis is undertaken by evaluating a pressure drop (50, 51, 60, 61) of the reagent (16), and a device for implementing the procedure. At first the pump (17) is switched off. Subsequently the metering is continued during a diagnosis metering operation. The reagent quantity (m) that has been dosed is determined during the diagnosis metering operation. Not until reaching a dosing quantity threshold ($m\_Lim$) the evaluation of the pressure drop (50, 51, 60, 61) is terminated.

15 Claims, 5 Drawing Sheets

PROCEDURE FOR DIAGNOSING A METERING VALVE OF AN EXHAUST GAS TREATMENT DEVICE AND DEVICE FOR IMPLEMENTING THE PROCEDURE

TECHNICAL FIELD

The invention is based on a procedure for diagnosing a metering valve of an exhaust gas treatment device and a device for implementing the procedure according to the category of the independent claims.

Subject of the present invention is also a control unit as well as a control unit program product.

BACKGROUND

DE 101 39 142 A1 describes an exhaust gas treatment device of a combustion engine, which uses a SCR-catalyst (selective-catalytic-reduction) for the reduction of the NOx-emissions that reduces the nitrous gases that are in the exhaust gas with the reducing agent ammoniac into nitrogen. The ammoniac is won in the exhaust gas area of the combustion engine from a urea/water solution that is sprayed into the exhaust gas area upstream before the SCR-catalyst. The urea/water solution that is stored in a storage tank is brought to a default metering pressure by a pump. For dosing the urea/water solution depending on the demand a metering valve is provided, which is adjusted to a default flow.

DE 10 2004 044 506 A1 describes a procedure and a device at which a reagent that is also under pressure is sprayed into the exhaust gas of a combustion engine before a SCR-catalyst. To support the spray process the familiar system uses compressed air that is led over a check valve, which provides an opening pressure. A diagnosis of the compressed air pressure is provided, which begins at a starting point of time of the diagnosis with the closing of the compressed air regulating valve. It is checked at least at a second point of time, whether the compressed air pressure corresponds with at least one lower threshold value, which corresponds at least approximately with opening pressure of the check valve that has been added to the ambient air pressure. An error-signal is provided if the condition is not fulfilled.

DE 10 2005 001 119 A1 describes a procedure and a device, which provides the spraying of an oxidizable reagent in the form of fuel into the exhaust gas area of a combustion engine upstream before an exhaust gas treatment device, which for 0065 ample contains an oxidation-catalyst, a particle filter, a NOx-storage catalyst and/or a SCR-catalyst, whereby the exhaust gas treatment device or at least a part of it shall be heated. A diagnosis of the exhaust gas treatment device is provided by controlling the reagent pressure. The reagent pressure that has been measured between a reagent security valve and a reagent metering valve is determined during different statutes of the reagent security valve and/or the reagent metering valve and compared with at least one threshold value. An error signal is provided in the case of a threshold exceeding.

DE 10 2004 043 366 A1 describes a procedure and a device, which again provides the spraying of a urea/water solution as the reagent that is under pressure into the exhaust gas of a combustion engine upstream before a SCR-catalyst. The familiar system provides a support of the spraying process by compressed air. the urea/water solution that is under pressure is led over a spray pip into the exhaust gas area of the combustion engine. A diagnosis is provided, at which it is checked, whether the spray pipe is completely or at least partially blocked. The diagnosis is started at a starting point of time by reducing the reagent pressure as well as the compressed air pressure. The time course of the reagent pressure that is detected after the starting point of time is checked, upon whether a reagent pressure drop occurred. Also the time course of the compressed air pressure that is detected after the starting point of time is checked, upon whether a compressed air pressure drop occurred. An error signal is provided, when each the reagent pressure and the compressed air pressure drop do not fall below a threshold value.

DE 10 2004 022 115 A1 again describes a procedure and a device, which provide the spraying of a urea/water solution as reagent that is under pressure into the exhaust gas of a combustion engine upstream before a SCR-catalyst. Also this familiar system uses compressed air to support the spraying process. A diagnosis of at least one pressure sensor is implemented, whereby a pressure sensor can be arranged in the reagent path as well as in the compressed air path. In at least a first time interval, in which a stationary pressure status should occur, it is checked, whether the pressure signal corresponds at least approximately with a default check pressure and/or whether a default change towards the stationary pressure occurred at least approximately. An error signal is provided, if at least one condition is not fulfilled.

The invention is based on the task to provide a procedure for diagnosing a metering valve of an exhaust gas treatment device and a device for implementing the procedure, which deliver a reliable diagnosis result.

The task is solved by the measures that are stated in the independent claims.

SUMMARY

The initial point of the procedure is an exhaust gas treatment device, which doses a reagent into the exhaust gas area of a combustion process, for example into the exhaust gas of a combustion engine, whereby the reagent is brought to a metering pressure by a pump and is then dosed by a metering valve. The diagnosis of the metering valve is carried out by evaluating a pressure drop of the reagent. The procedure distinguishes itself thereby, in that the pump is switched off and subsequently the metering is continued during a diagnosis metering operation, which determines the dosed reagent quantity in the diagnosis metering operation, and in that the evaluation of the pressure drop is terminated only when achieving a metering amount threshold.

The procedure is based on the idea, that the reliability of the diagnosis can be increased when the dosing quantity is considered at the diagnosis. Proposed is therefore a procedure, at which the diagnosis is only carried out conclusively, when a certain reagent quantity is dosed. Due to the metering of the reagent at a switched off pump an expected pressure drop must occur. Therefore a completely or at least partially blocked metering valve can be detected with the diagnosis according to the invention.

Advantageous improvements and embodiments of the procedure according to the invention accrue from dependent claims.

One embodiment provides that a leakage loss of the pump is considered when evaluating the pressure drop. Such a leakage loss of the pump can especially occur when an overflow valve is used in the pump for regulating the pump pressure. In that case it always has to be reckoned that an overflow valve is at least partially opened when reaching the default metering pressure. When switching off the pump the overflow valve is generally at least partially opened, so that a leakage loss occurs that results thereby occurs, which is noticeable at the beginning of the diagnosis after switching off the pump by a pressure drop and which is advantageously considered at the evaluation of the pressure drop.

Generally the leakage loss can be thereby considered that based on the metering pressure a low diagnosis starting pressure is detected, as from whose achievement the evaluation of the subsequent pressure drop starts and/or that the diagnosis starting pressure is considered at the determination of a criterion, especially at the determination of a threshold.

According to an embodiment it is provided, that the leakage loss of the pump is considered by a pressure drop constant.

Alternatively the leakage loss can be considered by a waiting time after switching off the pump. The waiting time is to be measured in such a way that the process, which causes the leakage loss of the pump, is mostly abated.

Alternatively the leakage loss of the pump can be considered by determining the gradient of the pressure drop and comparing it with a pressure gradient threshold, which has to be fallen below.

Furthermore the leakage loss can be considered by an opening of a bypass valve of the pump. By opening a bypass valve the reagent pressure can be decreased before the evaluation of the pressure drop onto a measure, at which the process that causes the leakage loss of the pump, is mostly abated.

One embodiment provides that the evaluation of the pressure drop provides a comparison of the measure reagent pressure with a pressure threshold. The pressure threshold is preferably determined variably depending on the currently present operating conditions at the beginning of the diagnosis, whereby the reliability of the diagnosis is increased.

One improvement of this embodiment provides the determination of the threshold depending on a diagnosis starting pressure, which can be determined according to one of the above described different approaches. Additionally the threshold is preferably determined depending on a default diagnosis pressure difference.

According to an embodiment a reasonability test of the diagnosis is thereby provided that at a realized error at least a further diagnosis is carried out, during which no diagnosis metering operation is undertaken. Thereby it can be determined, whether the metering valve is jammed in an opened state. Thereby it can be furthermore determined, whether a leakage loss occurred. To separate the different error causes further measures are required.

The device according to the invention for implementing the procedure concerns at first a customized control unit, which contains measures for implementing the procedure.

The control unit preferably contains at least one electrical memory, in which the steps of the procedure are saved as a control unit program.

The control unit program according to the invention provides that all steps of the procedure are implemented when it runs in a control unit.

The control unit program product with a program code that is saved on a machine readable medium according to the invention implements the procedure when the program runs in a control unit.

Further advantageous improvements and embodiments of the procedure according to the invention accrue from further dependent claims. Embodiments of the invention are illustrated in the drawing and further explained in the following description.

DETAILED DESCRIPTION

Figure 1:
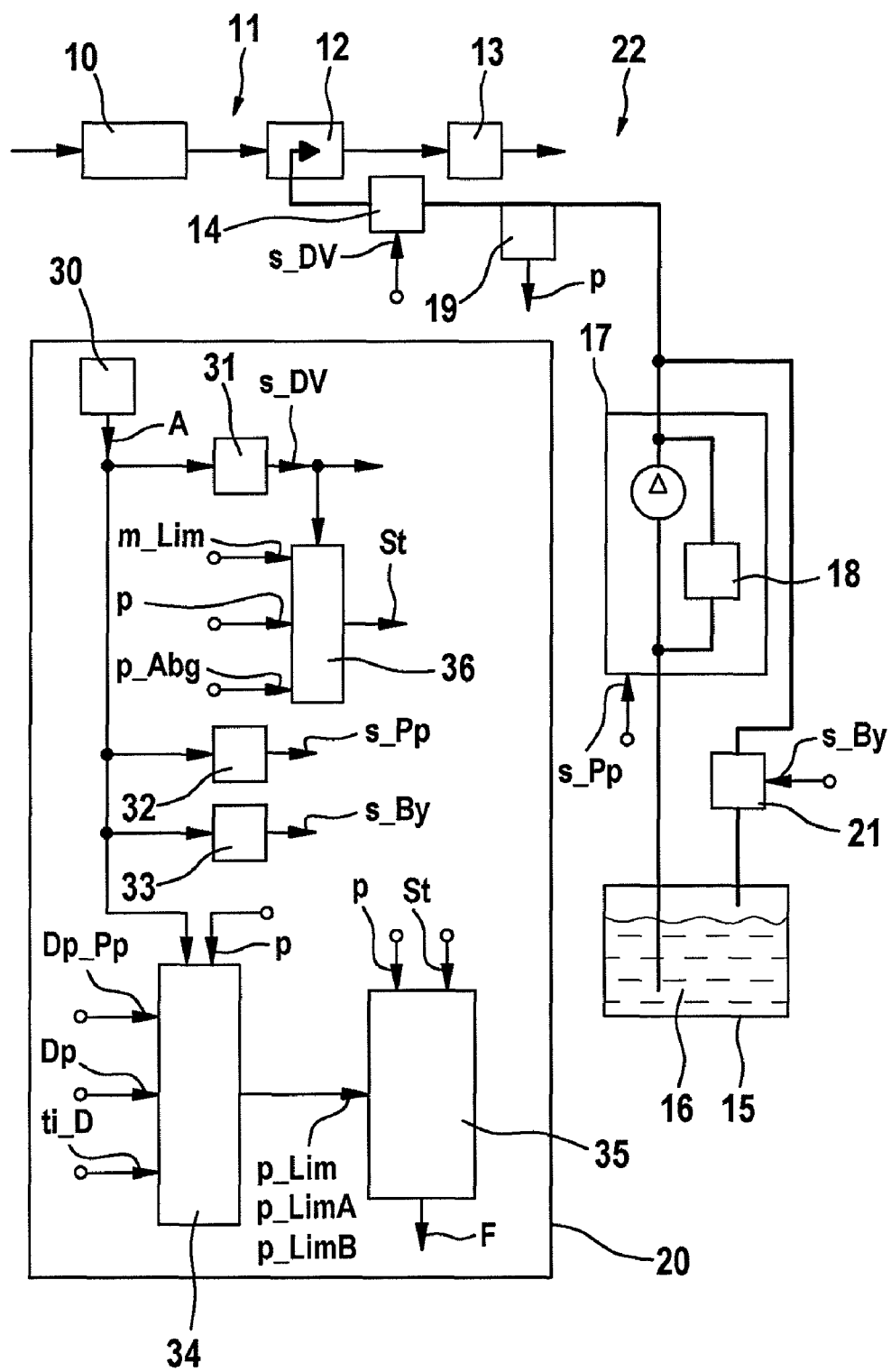
FIG. 1 shows a technical environment, in which a procedure according to the invention is carried out.

FIG. 1 shows a combustion engine 10, in whose exhaust gas area 11 a reagent introducing device 12 and downstream after the reagent introducing device 12 an exhaust gas treatment device 13 are arranged. The reagent introducing device 12 is connected to a metering valve 14, which is controlled by a metering valve control signal s_DV. The metering valve 14 determines the dosage rate of a reagent 16 that is stored in a reagent tank 15. A pump 17, which contains an overflow valve 18, brings the reagent 16 to a reagent pressure p that is detected by a pressure sensor 19.

The reagent pressure p is supplied to a control unit 20, which provides the metering valve control signal s_DV, a pump signal s_Pp as well as a bypass valve control signal s_By. The bypass valve control signal s_By is supplied to a bypass valve 21, which can be used for a pressure reduction of the reagent pressure p downstream after the pump 17, whereby the reagent is brought back into the reagent tank 15.

The reagent introducing device 12, the exhaust gas treatment device 13, the metering valve 15, the pump 17 as well as the bypass valve 21 are components of an exhaust gas treatment device 22, which is provided for purifying the exhaust gas of a combustion n process, as for example of a combustion process of at least one component that takes place in a combustion engine 10.

The exhaust gas treatment device 22 can for example be provide for removing nitrous gases from the exhaust gas of the combustion engine 10, whereby the exhaust gas treatment device 13 is especially realized as SCR-catalyst, which reduces nitrous gases for example with the reagent ammoniac. Ammoniac can be contained on the exhaust gas area 11 by a hydrolysis of a urea/water solution. In that case the urea/water solution is a preliminary stage of the reagent 16, which is also called reagent 16 in the following.

Depending on the specific embodiment especially of the exhaust gas treatment device 13 of the exhaust gas treatment device 22 an oxidizable reagent like fuel can be use for example as the reagent.

The control unit 20 contains a diagnosis control 30, which provides a demand signal A, when the diagnosis should be started. The demand signal A influences a metering signal determination 31, which provides the metering valve control signal s-DV. The demand signal A also influences a pump control 32, which provides the pump control signal s_Pp. Furthermore the demand signal A influences a bypass control 33, which provides a bypass control signal s_By. Moreover the demand signal A is brought to a threshold determination 34, which determines at least one threshold value from input signals.

Besides the reagent pressure p, a leakage loss constant Dp_Pp, a diagnosis pressure difference Dp and a waiting time ti_D are provided as input signals of the threshold value determination 34. The threshold determination 34 determines a pressure threshold value p_Lim, p_LimA, p_LimB.

The pressure threshold value p_Lim, p_LimA, p_LimB is supplied to a comparator 35, which compares the reagent pressure p with the pressure threshold value p_Lim, p_LimA, p_LimB during a present diagnosis stop signal St and provides an error signal F if necessary.

The diagnosis stop signal St provides a stop signal determination 36 depending on the metering valve control signal s_DV, a dosing quantity threshold m_Lim, the reagent pressure p as well as the exhaust gas pressure p_Abg that occurs in the exhaust gas area 11.

Figure 2:
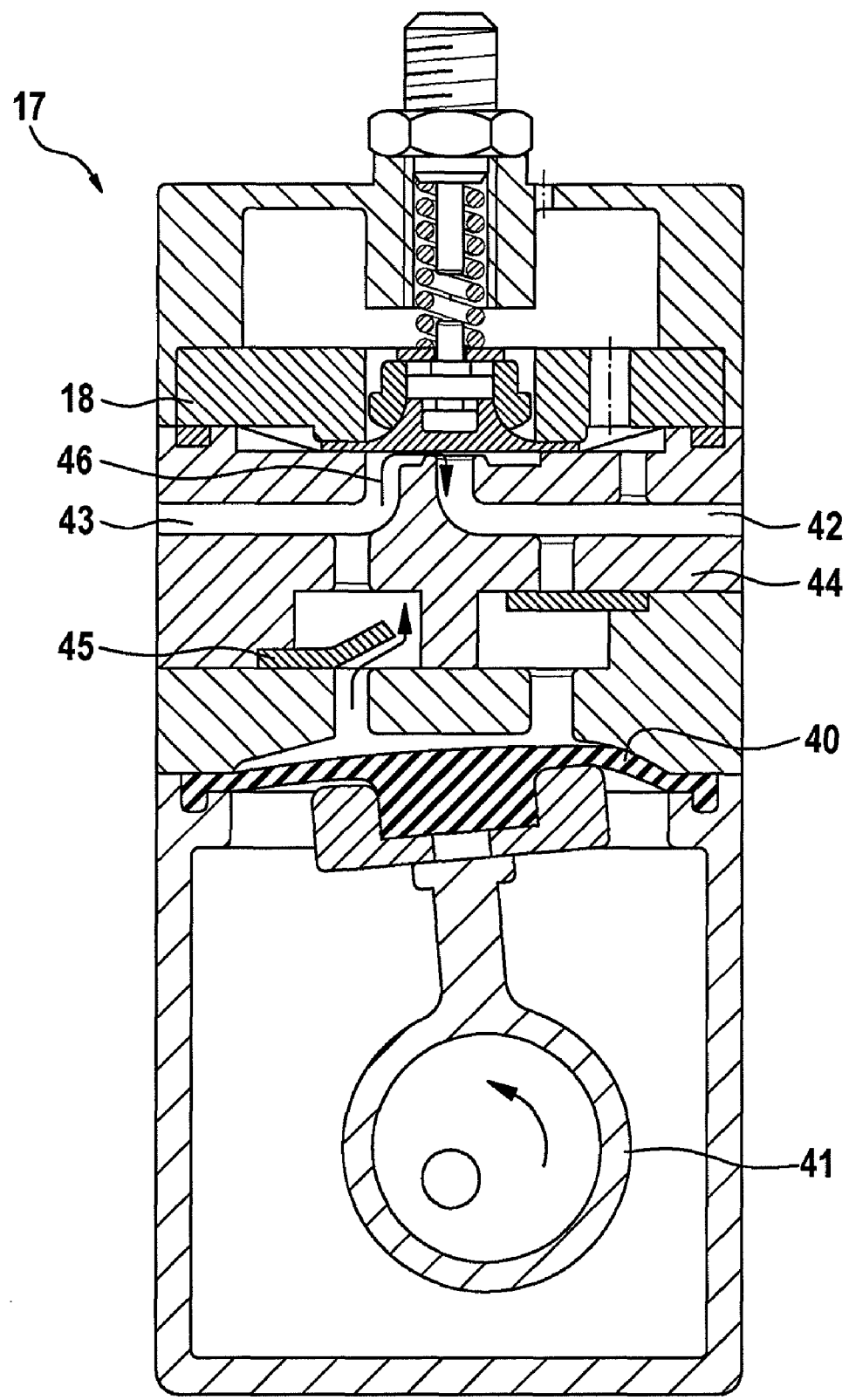
FIG. 2 shows a membrane pump, at which a leakage loss can occur.

The pump 17, which is shown in FIG. 1 and which contains an overflow valve 18, is shown in more detail in FIG. 2. The pump 17 is realized as a membrane pump, whose membrane 40 is driven by an eccentric drive 41, so that the reagent 16 is pumped from an entrance 42 to an exit 43 of the pump 17, whereby the reagent pressure p occurs at the exit 43. The streaming directions are preset by a first and a second control valve 44, 45.

The pump 17 contains the overflow valve 18, which opens when reaching the adjusted regular reagent pressure p during metering operation, so that an overflow 46 can take place to the entrance 42. According top the embodiment of the pump 17 that is shown in FIG. 2 the overflow valve 18 is realized as a membrane, which is tensioned against a spring. The pump 17 is usually dimensioned j=in such a way that an overflow 46 always occurs during the pump operation.

After switching off the pump 17 the overflow valve 18 does not close abruptly so that an overflow 46 still occurs, which decreases with an increasing closing. The overflow 46 is noticeable in the reagent pressure p as a leakage loss until the overflow valve 19 is completely closed, since switching off the pump 17 is a dynamic process, at which the reagent pressure p at the exit 43 and the reagent pressure p at the entrance 42 change completely during the closing of the overflow valve 18.

The approach of the invention is further explained by the signal courses depending on the time that are shown in FIGS. 3a-3e, 4a-4e and 5a-5f.

Figure 3A:
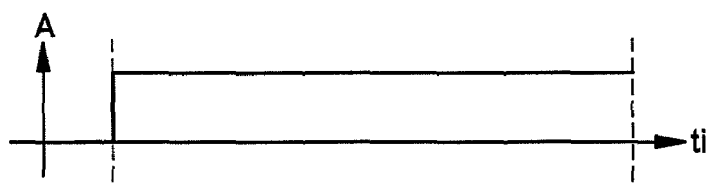
FIGS. 3a-3e show signal courses depending on the time, at which the leakage loss of the pump that is shown in FIG. 2 is considered by a leakage loss constant.
Figure 3B:
Figure 3C:
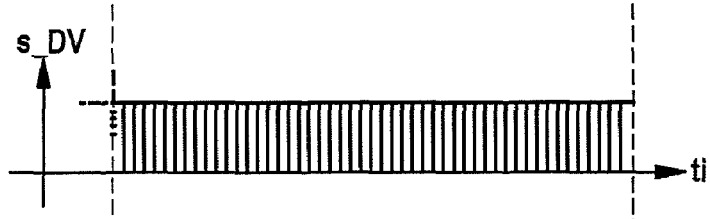

FIG. 3a shows the demand signal A depending on the time ti. The demand signal A provides the diagnosis demand 30 for example in the scope of a statutory provisioned on-board-diagnosis. With the occurrence of the demand signal A at a diagnosis starting point of time ti_S the pump control signal s_Pp that is shown in FIG. 3b is determined in such a way, that the pump 17 is switched off. The metering valve control signal s_DV that is shown in FIG. 3b is determined in such a way, that a default diagnosis metering operation is initiated. The shading of the signal course that is shown in FIG. 3c shall imply that a timed operation of the metering valve 14 for an exact adjustment of the flow rate during the diagnosis metering operation is provided.

Figure 3D:
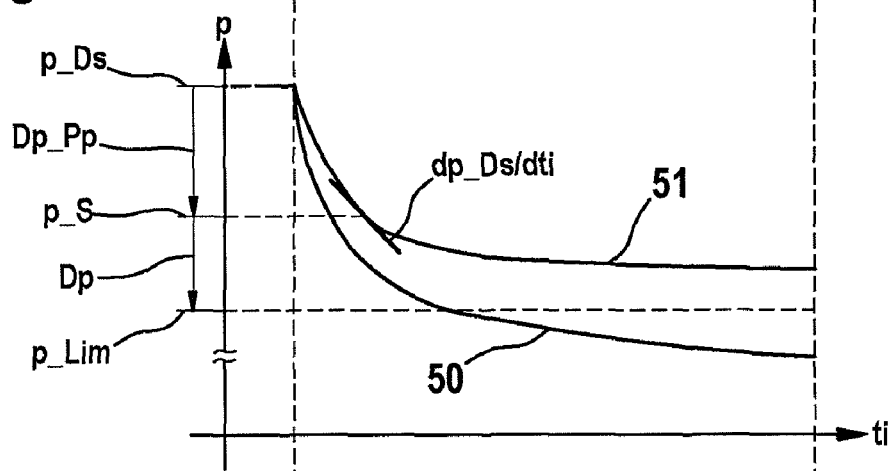

FIG. 3d shows the reagent pressure p, which provides a pressure drop 50, 51 from the diagnosis starting point of time ti_S on. The pressure drop 50, 51 that occurs due to the diagnosis metering operation is overlapped at the beginning of the diagnosis by the leakage loss of the pump 17 which is noticeable by an additional pressure drop.

According to a first embodiment the leakage loss of the pump 17 is considered by the leakage loss constant Dp_Pp in the threshold determination 34. The leakage loss constant Dp_Pp is subtracted at the beginning of the diagnosis at the diagnosis starting point of time ti_S from the regular metering pressure p_Ds, whereby the diagnosis starting pressure p_S is the result. Based on the determined diagnosis starting pressure p_S and preferably considering the default diagnosis pressure difference Dp the threshold determination 34 determines the pressure threshold p_Lim, so that the leakage loss constant Dp_Pp is considered at the determination or the pressure threshold p_Lim.

Additionally or alternatively the leakage loss can be considered thereby that the evaluation of the pressure drop 50, 51 only takes place when the reagent pressure p falls below the leakage loss constant Dp_Pp.

According to another embodiment the leakage loss of the pump 17 is thereby considered that the evaluation of the pressure drop 50, 51 is only undertaken after a diagnosis starting pressure p_S, which is determined by the determination of the pressure gradient dp_Ds/dti. As long as the pressure gradient dp_Ds/dti does not fall below a not further illustrated gradient threshold, the diagnosis starting pressure p_S is determined and based on the diagnosis starting pressure p_S preferably while considering the default diagnosis pressure difference Dp the pressure threshold p_Lim is determined. The diagnosis pressure difference Dp can deviate from the diagnosis pressure difference according to the previous embodiment.

Figure 3E:
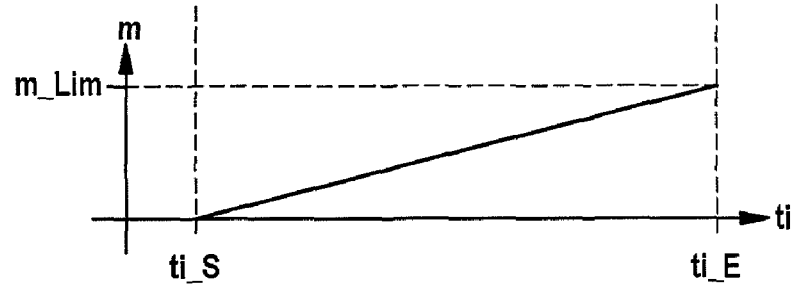

Both these embodiments assume that according to FIG. 3e the diagnosis metering operation already began at the diagnosis starting point of time ti_S. But it is also possible at the first and the second embodiment to start the diagnosis metering operation not until the reagent pressure p reaches the diagnosis starting pressure p_S.

FIG. 3d shows a drop 50 of the reagent pressure p, which lies below the pressure threshold p_Lim at a diagnosis ending point of time ti_E. Furthermore a drop 51 of the reagent pressure p is shown, which always runs above the pressure threshold p_Lim. Hereby the pressure drop 50 corresponds with an expected pressure drop, at which the reagent pressure p falls below the pressure threshold p_Lim. In that case it is assumed that the metering valve 14 works properly and is not blocked or also not partially blocked. The pressure drop 51 on the other hand corresponds with a pressure drop, at which it is assumed that the metering valve 14 is at least partially blocked.

The diagnosis ending point of time ti_E is provided by the stop signal determination 36, when the dosing quantity m reaches a default dosing quantity threshold m_Lim during the diagnosis metering operation. The stop signal determination 36 integrates the metering valve control signal s_DV according to FIG. 3e for calculating the dosing quantity, whereby the reagent pressure p can be considered as the first correction parameter and the exhaust gas pressure p_Abg for example as a further correction parameter. With the provision of the diagnosis stopping signal St at the diagnosis ending point of time ti_E the diagnosis and therefore the evaluation of the pressure drop 50, 51 are terminated. The comparator 35 provides the error signal F, when the reagent pressure p shows a course corresponding with the pressure drop 51, at which it has not fallen below the pressure threshold p_Lim until reaching the diagnosis ending point of time ti_E.

Figure 4A:
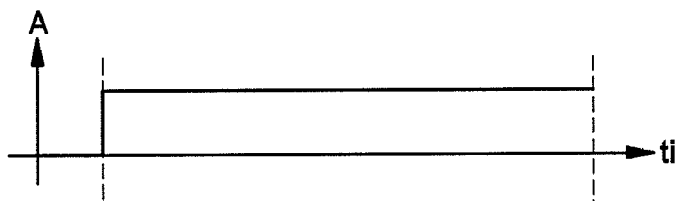
FIGS. 4a-4e show signal courses depending on the time, at which the leakage loss of the pump that is shown in FIG. 2 is considered by a waiting time.
Figure 4B:
Figure 4C:
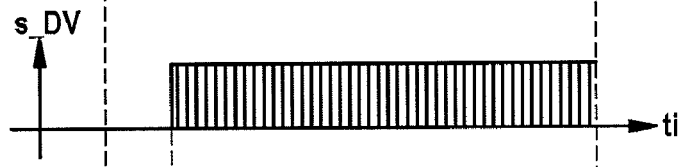
Figure 4D:
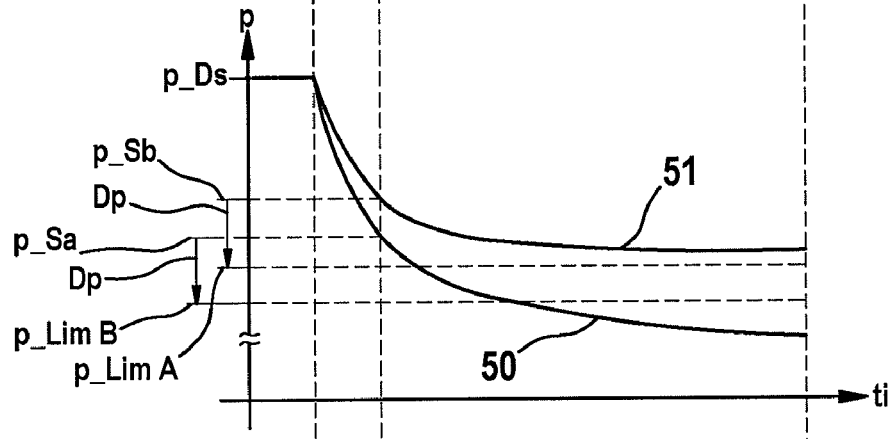
Figure 4E:
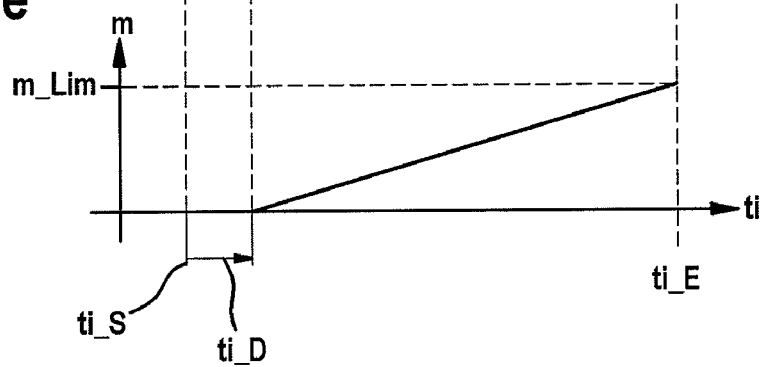

According to a further embodiment the leakage loss of the pump 17 is considered by the default waiting time ti_D. the approach is further explained by FIGS. 4a-4e, whereby FIG. 4a and 4b correspond with FIGS. 3a and 3b.

After the beginning of the diagnosis at the diagnosis starting point of time ti_S the waiting time ti_D is provided and determined in such a way, that the influence of the leakage loss of the pump 17 onto the drop of the reagent pressure p is completely or at least substantially omitted. Preferably the waiting time ti_D is determined experimentally. According to FIG. 4c the metering valve control signal s_DV is determined for example not until the lapse of the waiting time ti_D, so that the diagnosis metering operation begins.

Two pressure drops 50, 51 are again shown in FIG. 4d, whereby again the pressure drop 51 causes the provision of the error signal F. after the lapse of the waiting time ti_D a diagnosis starting pressure p_Sa occurs at the pressure drop 50 and a diagnosis starting pressure p_Sb at the pressure drop 51, whereby the diagnosis starting pressure p_Sb is higher than the other diagnosis starting pressure p_Sa due to the slower pressure drop 51.

Based on the diagnosis starting pressure p_Sa, p_Sb the pressure threshold p_LimA, p_LimB is determined each by a subtraction of the diagnosis pressure difference Dp.

Depending on the diagnosis starting pressure p_Sa, p_Sb different diagnosis pressure differences Dp can be specified. Furthermore the diagnosis pressure difference Dp can deviate according to this embodiment from the diagnosis pressure difference Dp of the previous embodiments.

The diagnosis according to this embodiment is also terminated when the evaluation of the pressure drop 50, 51 is ended, when the diagnosis ending point of time ti_E occurs when the dosing quantity threshold m_Lim is reached with the occurrence of the diagnosis stopping signal St. It has been assumed at the signal courses shown in FIGS. 4c and 4e that the diagnosis metering operation has been initiated not until the lapse of the waiting time ti_D. Principally it is also possible to release the diagnosis metering operation already at the diagnosis starting point of time ti_S.

According to the following embodiments the leakage loss of the pump 17 is considered by an aimed pressure drop in the pump 17 and thereby of the reagent pressure p by the bypass valve 21. The approach is further explained by FIGS. 5a-5f, whereby the FIG. 5a and 5b correspond with FIGS. 3a and 3b.

After the beginning of the diagnosis at the diagnosis starting point of time ti_S the controlling of the bypass valve 21 is provided by the bypass valve control signal s_By. Thereby the diagnosis stating pressure p_S is adjusted in such a way, that the leakage loss of the pump 17 is almost completely eliminated by a fast closing of the overflow valve 18.

The bypass valve 21 is controlled for a certain bypass valve control time ti_By. Preferably the bypass valve control signal s_By or the bypass valve control time ti_By are determined experimentally. FIG. 5e again shows two pressure drops 60, 61, whereby the pressure drop 61 causes the provision of the error signal F. the steep beginning of both pressure drops 60, 61 is created by the short bypass valve control time ti_By.

Subsequently the diagnosis starting pressure p_S occurs based on which preferably the pressure threshold p_Lim is determined. But also the diagnosis pressure difference DP can be determined depending on the diagnosis starting pressure p_S, so that the pressure threshold p_Lim varies depending on the initial operating situation. The diagnosis pressure difference Dp according to this embodiment can deviate from the diagnosis pressure differences Dp of the previous embodiments due to the modified initial situation at the beginning of the evaluation of the pressure drop 60, 61.

Also according to this embodiment the diagnosis is terminated at the diagnosis ending point of time ti_E and the evaluation of the pressure drop 60, 61 is terminated when the dosing quantity threshold m_Lim is reached and the diagnosis stop signal St is provided by the stop signal determination 36.

Figure 5A:
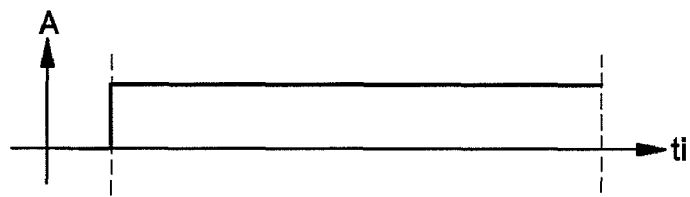
FIGS. 5a-5f show signal courses depending on the time, at which the leakage loss of the pump that is shown in FIG. 2 is removed by a bypass valve.
Figure 5B:
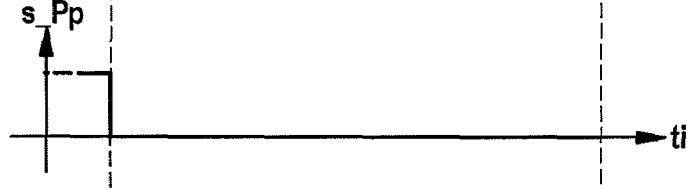
Figure 5C:
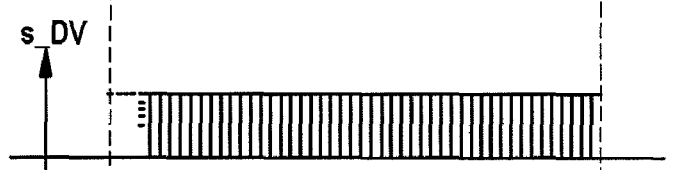
Figure 5D:
Figure 5E:
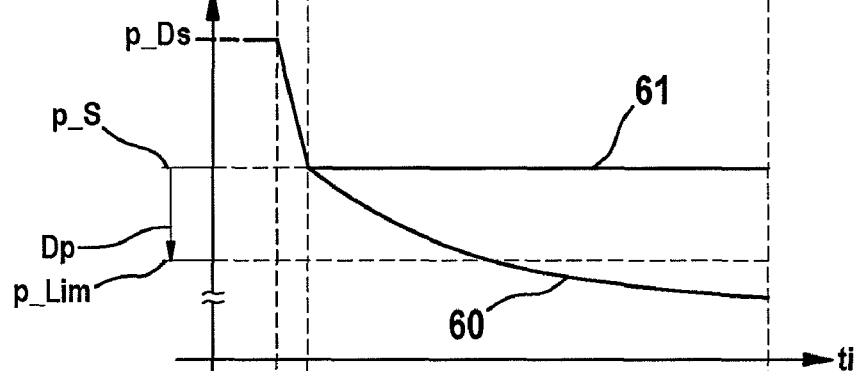
Figure 5F:
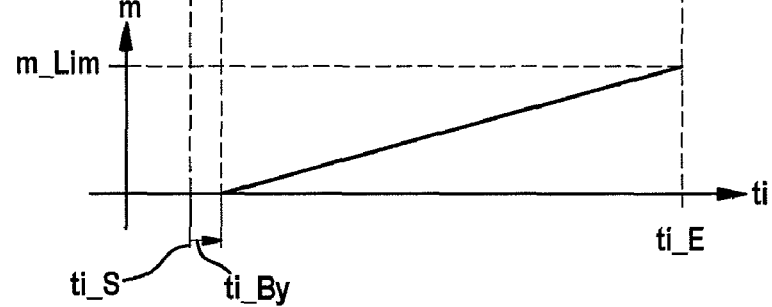

According to FIG. 5c the metering valve control signal s_DV is preferable activated after switching off the bypass valve control signal s_By for specifying the diagnosis metering operation. But alternatively the diagnosis metering operation can also be activated at this embodiment immediately at the diagnosis starting point of time ti_S.

One embodiment provides that when an error is detected or when the error signal F occurs a reasonability test of the diagnosis result is undertaken by carrying out a further diagnosis, during which no diagnosis metering operation is specified. Thereby it is expected that the pressure drop 50, 51, 60, 61 does not fall below the pressure threshold p_Lim, p_LimA, p_LimB.

The invention claimed is:

1. A method of diagnosing a metering valve of an exhaust gas treatment device, wherein the metering valve meters a reagent into an exhaust gas area of a combustion process, the method comprising:
   bringing the reagent to a metering pressure by a pump;
   metering the reagent into the exhaust gas area; and
   implementing a diagnosis metering operation, comprising:
      switching off the pump;
      continuing metering of the reagent;
      evaluating a pressure drop of the reagent;
      determining a reagent quantity metered; and
      terminating evaluation of the pressure drop upon reaching a dosing quantity threshold.

2. A method according to claim 1, further comprising upon evaluating a pressure drop of the reagent, considering a leakage loss of the pump.

3. A method according to claim 2, further comprising considering the leakage loss of the pump by a pressure drop constant.

4. A method according to claim 2, further comprising considering the leakage loss of the pump by a waiting time after switching off the pump.

5. A method according to claim 2, further comprising considering the leakage loss of the pump by determining a gradient of the pressure drop.

6. A method according to claim 2, further comprising considering the leakage loss of the pump by an opening of a bypass valve.

7. A method according to claim 1, further comprising upon evaluating a pressure drop of the reagent, providing a comparison of a reagent pressure with a pressure threshold value.

8. A method according to claim 7, further comprising determining the pressure threshold value based on a diagnosis starting pressure.

9. A method according to claim 8, further comprising determining the pressure threshold value based on a diagnosis pressure difference.

10. A method according to claim 9, further comprising determining the diagnosis pressure difference based on the diagnosis starting pressure.

11. A method according to claim 1, further comprising upon detection of an error signal, evaluating a diagnosis result by implementing a second diagnosis, comprising:
   bringing the reagent to a metering pressure by a pump; and
   metering the reagent into the exhaust gas area.

12. A device, especially at least one control, to implement a method of diagnosing a metering valve of an exhaust gas treatment device, wherein the metering valve meters a reagent into an exhaust gas area of a combustion process, the method comprising: bringing the reagent to a metering pressure by a pump; metering the reagent into the exhaust gas area; and implementing a diagnosis metering operation, comprising: switching off the pump; continuing metering of the reagent; evaluating a pressure drop of the reagent; determining a reagent quantity metered; and terminating evaluation of the pressure drop upon reaching a dosing quantity threshold.

13. The device of claim 12, further comprising:
   a diagnosis-demand;
   a threshold value determination;

a metering valve control;
a pump control; and
a comparator.

14. A control unit program to implement steps, if executed on a control unit, a method of diagnosing a metering valve of an exhaust gas treatment device, wherein the metering valve meters a reagent into an exhaust gas area of a combustion process, the method comprising: bringing the reagent to a metering pressure by a pump; metering the reagent into the exhaust gas area; and implementing a diagnosis metering operation, comprising: switching off the pump; continuing metering of the reagent; evaluating a pressure drop of the reagent; determining a reagent quantity metered; and terminating evaluation of the pressure drop upon reaching a dosing quantity threshold.

15. A control unit program product with a program code saved on a machine readable medium to implement steps, if executed on a control unit, a method of diagnosing a metering valve of an exhaust gas treatment device, wherein the metering valve meters a reagent into an exhaust gas area of a combustion process, the method comprising: bringing the reagent to a metering pressure by a pump; metering the reagent into the exhaust gas area; and implementing a diagnosis metering operation, comprising: switching off the pump; continuing metering of the reagent; evaluating a pressure drop of the reagent; determining a reagent quantity metered; and terminating evaluation of the pressure drop upon reaching a dosing quantity threshold.

* * * * *